(12) United States Patent
Jaross

(10) Patent No.: US 12,524,354 B2
(45) Date of Patent: Jan. 13, 2026

(54) METHODS AND APPARATUS TO MANAGE TRANSMISSIONS BETWEEN DOMAINS AND MEMORY

(71) Applicant: The Boeing Company, Arlington, VA (US)

(72) Inventor: Joshua David Jaross, Gig Harbor, WA (US)

(73) Assignee: The Boeing Company, Arlington, VA (US)

( * ) Notice: Subject to any disclaimer, the term of this patent is extended or adjusted under 35 U.S.C. 154(b) by 24 days.

(21) Appl. No.: 18/441,745

(22) Filed: Feb. 14, 2024

(65) Prior Publication Data

US 2025/0258780 A1    Aug. 14, 2025

(51) Int. Cl.
*G06F 13/16*    (2006.01)
*G06F 13/42*    (2006.01)

(52) U.S. Cl.
CPC .......... *G06F 13/16* (2013.01); *G06F 13/4282* (2013.01); *G06F 2213/0028* (2013.01)

(58) Field of Classification Search
None
See application file for complete search history.

(56) References Cited

U.S. PATENT DOCUMENTS

| | | | |
|---|---|---|---|
| 7,917,665 B1 * | 3/2011 | Booth | G06F 11/008 710/16 |
| 11,750,568 B1 * | 9/2023 | Rasekh | H04L 67/56 726/1 |
| 2010/0235561 A1 | 9/2010 | Goldring | |
| 2011/0153969 A1 | 6/2011 | Petrick | |
| 2020/0396250 A1 | 12/2020 | Nguyen et al. | |

OTHER PUBLICATIONS

European Patent Office, "Extended European Search Report" issued in connection with European Application No. 24195080, Jan. 3, 2025, 7 pages.

* cited by examiner

*Primary Examiner* — Farley Abad
*Assistant Examiner* — Dayton Lewis-Taylor
(74) *Attorney, Agent, or Firm* — Hanley, Flight & Zimmerman, LLC

(57) ABSTRACT

Methods and apparatus to manage transmissions between domains and memory are disclosed. An example apparatus comprises memory, a first domain having a first classification, the first domain conductively coupled to the memory, the first domain including a first bus adapter enabling transmission of first data to the memory, the first data associated with the first domain, and a first expander to facilitate the transmission of the first data to the memory, the memory to store the first data, and a second domain conductively coupled to the memory, the second domain having a second classification, the second domain including a second bus adapter enabling access of the first data from the memory, the second bus adapter preventing second data from exiting the second domain, the second data associated with the second domain, and a second expander to facilitate the access of the first data from the memory.

17 Claims, 5 Drawing Sheets

METHODS AND APPARATUS TO MANAGE TRANSMISSIONS BETWEEN DOMAINS AND MEMORY

GOVERNMENT INTEREST

This invention was made with Government support under (N00019-14-C-0067) awarded by Department of Defense. The government has certain rights in this invention.

FIELD OF THE DISCLOSURE

This disclosure relates generally to data processing and, more particularly, to methods and apparatus to manage transmissions between domains and memory.

BACKGROUND

Many computing platforms, such as personal computers (PCs), are used for critical data management tasks. Such tasks include managing and manipulating financial, confidential, and/or other sensitive data. The secure management of sensitive data may be a significant concern in aerospace, military, government, etc., industries.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
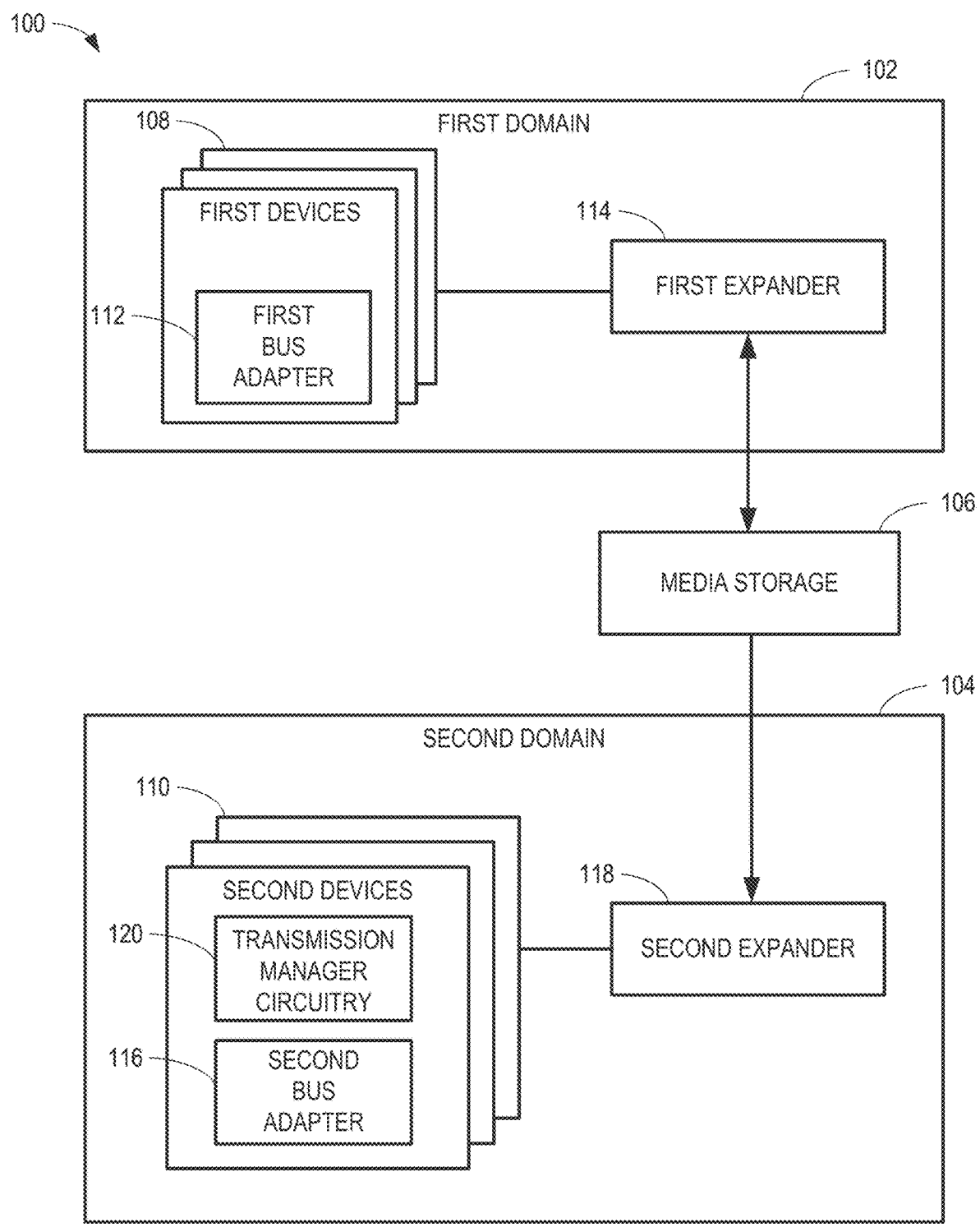
FIG. 1 is a block diagram of an example environment in which a first example domain and a second example domain are conductively coupled to an example media storage.

In an example computing domain, multiple computing devices may be communicatively coupled to one another. An organization may have any number of computing domains, each including a distinct network of computing devices (e.g., desktop computers, laptops, servers, etc.). Cross-domain communication may become complicated when the domains have varying levels of security, clearance, authorizations, etc. For example, a first example domain may have a first classification (e.g., unclassified) and a second example domain may have a second classification (e.g., classified, sensitive, confidential, etc.) different from (e.g., higher than) the first classification. In this example, the second domain may be a government agency having files, data, information, etc., with privacy concerns. Further, the first domain may be a contractor (e.g., supplier, civil engineering firm, aerospace contractor, etc.) in business and/or otherwise communicating with the government agency. The example government agency may have a business interest in accessing data files (e.g., map data, software, test results, etc.) associated with the contractor, but the government agency may need to insulate (e.g., protect, shield, etc.) classified data files from the contractor.

One previous solution to protect classified domains includes copying unclassified data to an external disk (e.g., compact disc (CD), digital video disk (DVD), Bluray, etc.), unplugging the external disk from the unclassified device, plugging the external disk into a device in the classified domain, and uploading the unclassified data to the classified device. However, this technique is time consuming (e.g., taking multiple days) as the file size of the unclassified data increases. As such, copying the unclassified data to an external disk may limit the amount of data accessible to any given device in the classified domain. In turn, this may burden and/or hinder business efforts that require high volumes of data, communication, etc., between domains.

Another previous solution includes employing single drive universal serial bus (USB) write blocker devices. For example, a USB write blocker device can connect an example computing device (e.g., via a USB connection) to a media storage (e.g., memory, database, etc.). The example USB write blocker device limits the computing device to "read-only" access to the media storage. In other words, the computing device may only access data in the media storage and may not write (e.g., transmit, modify, etc.) data to the media storage. However, these USB write blocker devices limit the media storage to connect to only one computing device at a time. As such, burdensome, manual interaction is needed to facilitate connections between the USB write blocker device, the media storage, classified devices, and unclassified devices. This manual interplay fatigues the electrical connections of the USB write blocker device, USB interfaces on the devices, the USB interface of the media storage, etc., which can cause electrostatic discharge (ESD) between the devices. Further, the manpower to facilitate the plugging/unplugging of devices is time expensive and bothersome.

Examples disclosed herein provide a hardware configuration that maintains electrical connections between an unclassified domain, a classified domain, and a memory device, while also preventing output of classified data from the classified domain. As such, disclosed examples may prevent the unauthorized disclosure of classified data. Moreover, disclosed examples reduce or eliminate the manual intervention of plugging/unplugging devices by providing a static hardware configuration that connects multiple devices in the classified domain and multiple devices in the unclassified domain to the memory device. Thus, disclosed examples free up hours of manual labor that would otherwise be needed to facilitate the flow of unclassified data.

FIG. 1 is a block diagram of an example environment 100 in which a first example domain 102 and a second example domain 104 are conductively coupled to an example media storage (e.g., memory, memory device, etc.) 106. The first domain 102 has a first classification and the second domain 104 has a second classification different from the first classification. For example, the first classification may indicate a first security clearance and the second classification may indicate a second security clearance higher than the first security clearance. In other examples, the first domain 102 represents an unclassified (e.g., not confidential) domain having any number of first example devices 108 communicatively coupled to one another. Further, the second domain 104 represents a classified (e.g., confidential) domain having any number of second example devices 110 communicatively coupled to one another. The first example devices 108 and/or the second example devices 110 may include desktop computers, laptops, servers, etc. In the example of FIG. 1, classifications of data match classifications of the domain that provides the data. For example, data associated with the first domain (hereinafter "first data" and/or "unclassified data") includes the first classification and data associated with the second domain (hereinafter "second data" and/or "classified data") includes the second classification. In some examples, the second data is sensitive data that first devices 108 associated with the first domain 102 may not have authorization to access, view, modify, etc., (e.g., based on the first and second classifications).

The first example devices 108 each include a first example bus adapter 112 that conductively couples the first domain 102 to the media storage 106. In some examples, the first example bus adapter 112 may be external to one of the first devices 108, such that the first bus adapter 112 is conductively coupled to the one of the first devices 108 (e.g., via a wired connection). The first example bus adapter 112 enables (e.g., permits) transmission of the unclassified data from the first domain 102 to the media storage 106. The first example domain 102 includes a first example expander 114 to facilitate the transmission of the unclassified data to the media storage 106. As such, the media storage 106 can store the unclassified data. The first example expander 114 is conductively coupled to the first bus adapter 112. In this example, there is one first expander 114. However, the first domain 102 may include any number of first expanders (e.g., connecting one or more of the first devices 108 to the media storage 106).

The second example devices 110 each include a second example bus adapter 116 that conductively couples the second domain 104 to the media storage 106. In some examples, the second bus adapter 116 may be external to one of the second devices 110, such that the second bus adapter 116 is conductively coupled to the one of the second devices 110 (e.g., via a wired connection). The second example bus adapter 116 enables access of the unclassified data from the media storage 106. In particular, the second bus adapter 116 enables the second devices 110 to access the unclassified data from the media storage 106. However, the second bus adapter 116 prevents classified data from exiting the second domain 104. For example, the second bus adapter 116 prevents transmissions of classified data from any one of the second devices 110 to the media storage 106. The second domain 104 includes a second example expander 118 to facilitate the access of the unclassified data from the media storage 106. The second expander 118 is conductively coupled to the second bus adapter 116. In this example, there is one second expander 118. However, the second domain 104 may include any number of second expanders (e.g., connecting one or more of the second devices 110 to the media storage). Further, the second devices 110 include example transmission manager circuitry 120 to facilitate the flow of unclassified data to the second devices 110, described in detail in connection with FIGS. 3 and 4.

At least one of the first example expander 114 or the second expander 118 may be a Serial Attached Small Computer System Interface (SCSI) (SAS) expander. Further, the media storage 106 may be a SAS media storage device. At least one of the first bus adapter 112 or the second bus adapter 116 may be a Host Bus Adapter (HBA) SAS card. In the example of FIG. 1, the first bus adapter 112 is a read/write enabled HBA SAS card. As such, the first bus adapter 112 is a circuit board, controller chip, integrated circuit adapter, etc., configured to manage the flow of unclassified data such that the first devices 108 can write (e.g., modify, transmit, add, etc.) unclassified data to the media storage 106 and read (e.g., access, retrieve, etc.) data in the media storage 106. Further, in the example of FIG. 1, the second bus adapter 116 is a write-block enabled HBA SAS. As such, the second bus adapter 116 is a circuit board, controller chip, integrated circuit adapter, etc., configured to manage the flow of classified data such that the second devices 110 cannot write classified data to the media storage 106 but can read the unclassified data stored in the media storage 106. For example, if any one of the second devices 110 instantiates a command to transmit classified data to the media storage 106, then the second bus adapter 116 intercepts and/or otherwise blocks the command from arriving at the media storage 106. In this way, the first devices 108 and the second devices 110 do not communicate directly with one another, but rather employ the media storage 106 to pass transmissions of the unclassified data. Thus, the risk of inadvertent, unauthorized transmission of classified data from the second domain 104 to the first domain 102 is prevented.

Figure 2:
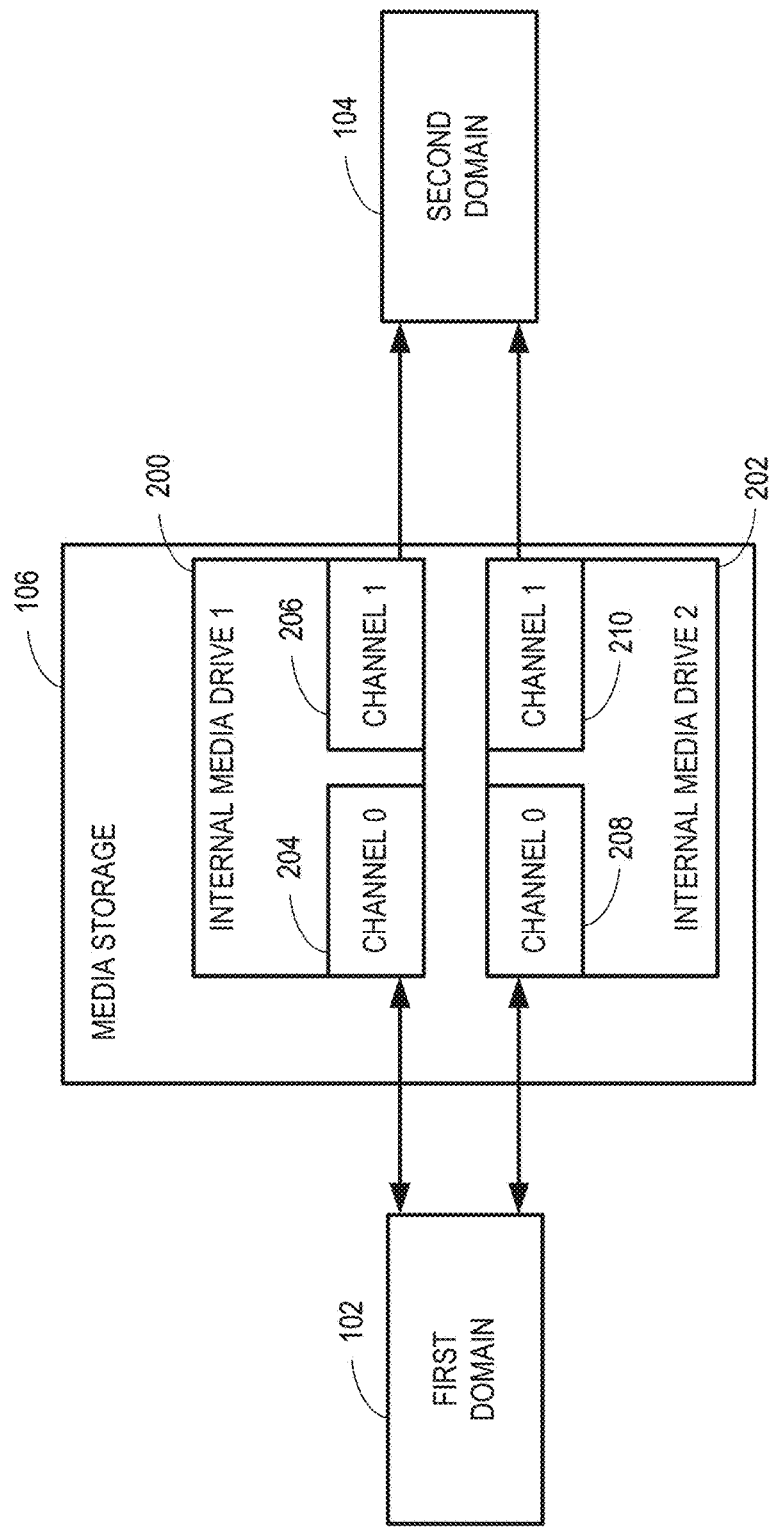
FIG. 2 is a detailed view of the example media storage of FIG. 1.

FIG. 2 is a detailed view of the example media storage 106 of FIG. 1. The example media storage 106 includes a first example internal media drive 200 and a second example internal media drive 202. The first example internal media drive 200 includes a first example input channel 204 and a first example output channel 206. Similarly, the second example internal media drive 202 includes a second example input channel 208 and a second example output channel 210. The first domain 102 is conductively coupled to the first and second internal media drives 200, 202 (e.g., via the first expander 114 in FIG. 1). In particular, the first domain 102 is conductively coupled the first and second input channels 204, 208 via the first expander 114 and other wired connections (e.g., SAS cabling). Additionally, the second domain 104 is conductively coupled to the first and second internal media drives 200, 202 (e.g., via the second expander 118 in FIG. 1). In particular, the second domain 104 is conductively coupled to the first and second output channels 206, 210 via the second expander 118 and other wired connections. In the example of FIG. 2, the media storage 106 includes two internal media drives (e.g., the first internal media drive 200 and the second internal media drive 202). In other examples, the media storage 106 can include any number of internal media drives (e.g., 1-65,535 SAS media drives). For example, the first domain 102 may be conductively coupled to one or more internal media drives (e.g., within the SAS media storage 106). Additionally, the second domain 104 may be conductively coupled to one or more internal media drives (e.g., within the SAS media storage 106).

Figure 3:
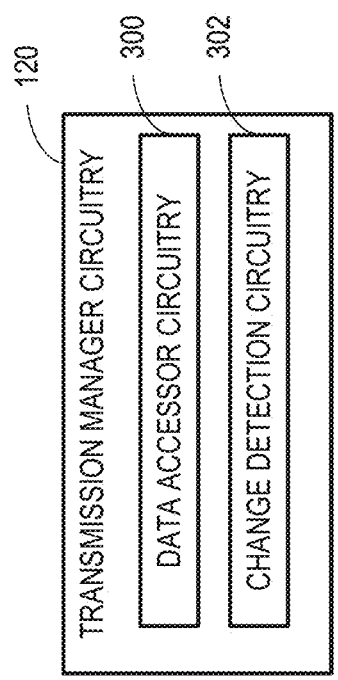
FIG. 3 is a block diagram of an example implementation of example transmission manager circuitry of FIG. 1.

FIG. 3 is a block diagram of an example implementation of the example transmission manager circuitry 120 of FIG. 1 to access unclassified data in the media storage 106. The example transmission manager circuitry 120 includes example data accessor circuitry 300 and example change detection circuitry 302. The example transmission manager circuitry 120 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the example transmission manager circuitry 120 of FIG. 3 may be instantiated (e.g., creating an instance of, bring into being for any length of time, materialize, implement, etc.) by an Application Specific Integrated Circuit (ASIC) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or performing operations to implement one or more virtual machines and/or containers.

The example data accessor circuitry 300 accesses, via a first one of the second devices 110, unclassified data stored in the media storage 106. The first one of the second devices 110 is conductively coupled to the media storage 106 via the second bus adapter 116 and the second expander 118. The second bus adapter 116 prevents the first one of the second devices 110 from transmitting classified data to the media storage 106. In some examples, the data accessor circuitry 300 can access changes (e.g., modifications, additions, etc.) of the unclassified data in the media storage 106. In some examples, the data accessor circuitry 300 is instantiated by programmable circuitry executing data accessing instructions and/or configured to perform operations such as those represented by the flowchart of FIG. 4.

The example change detection circuitry 302 detects (e.g., determines) changes associated with the unclassified data stored in the media storage 106. In some examples, the change detection circuitry 302 determines that there has been a change to the unclassified data when there is an addition of data (e.g., third data) to the media storage 106, the third data associated with the unclassified domain (the first domain 102). In other examples, the change detection circuitry 302 determines that there has been a change to the unclassified data stored in the media storage 106 when at least one of the first devices 108 writes, modifies, updates, replaces, etc., the unclassified data stored in the media storage 106. As such, the change detection circuitry 302 can monitor the media storage 106 for such changes. In some examples, the change detection circuitry 302 is instantiated by programmable circuitry executing detecting instructions and/or configured to perform operations such as those represented by the flowchart of FIG. 4.

In some examples, the example transmission manager circuitry 120 includes means for accessing data from a media storage. For example, the means for accessing may be implemented by the data accessor circuitry 300. In some examples, the data accessor circuitry 300 may be instantiated by programmable circuitry such as the example programmable circuitry 512 of FIG. 5. For instance, the data accessor circuitry 300 may be instantiated by any other combination of hardware, software, and/or firmware executing machine executable instructions such as those implemented by at least blocks 402, 408 of FIG. 4. For example, the data accessor circuitry 300 may be implemented by at least one or more hardware circuits (e.g., processor circuitry, discrete and/or integrated analog and/or digital circuitry, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the example transmission manager circuitry 120 includes means for detecting a change. For example, the means for detecting may be implemented by the change detection circuitry 302. In some examples, the change detection circuitry 302 may be instantiated by programmable circuitry such as the example programmable circuitry 512 of FIG. 5. For instance, the change detection circuitry 302 may be instantiated by any other combination of hardware, software, and/or firmware executing machine executable instructions such as those implemented by at least blocks 404, 406 of FIG. 4. For example, the change detection circuitry 302 may be implemented by at least one or more hardware circuits (e.g., processor circuitry, discrete and/or integrated analog and/or digital circuitry, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the example transmission manager circuitry 120 of FIG. 1 is illustrated in FIG. 3, one or more of the elements, processes, and/or devices illustrated in FIG. 3 may be combined, divided, re-arranged, omitted, eliminated, and/or implemented in any other way. Further, the example data accessor circuitry 300, the example change detection circuitry 302, and/or, more generally, the example transmission manager circuitry 120 of FIG. 3, may be implemented by hardware alone or by hardware in combination with software and/or firmware. Thus, for example, any of the example data accessor circuitry 300, the example change detection circuitry 302, and/or, more generally, the example transmission manager circuitry 120, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), and/or programmable logic device(s) (PLD(s)). Further still, the example transmission manager circuitry 120 of FIG. 3 may include one or more elements, processes, and/or devices in addition to, or instead of, those illustrated in FIG. 3, and/or may include more than one of any or all of the illustrated elements, processes and devices.

Figure 4:
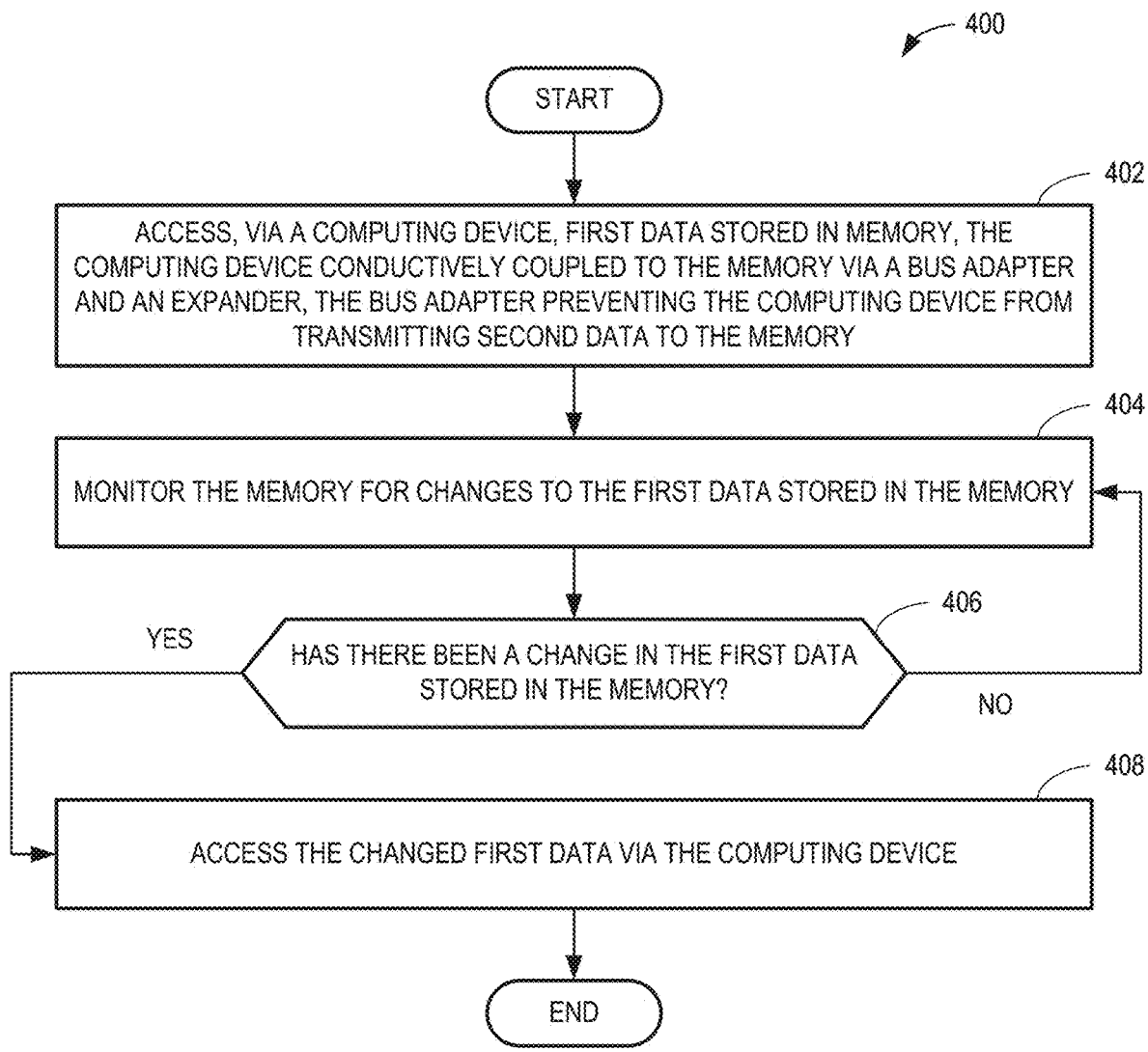
FIG. 4 is a flowchart representative of example machine readable instructions and/or example operations that may be executed, instantiated, and/or performed by example programmable circuitry to implement the example transmission manager circuitry of FIG. 3.

A flowchart representative of example machine readable instructions, which may be executed by programmable circuitry to implement and/or instantiate the example transmission manager circuitry 120 of FIG. 3 and/or representative of example operations which may be performed by programmable circuitry to implement and/or instantiate the example transmission manager circuitry 120 of FIG. 3, are shown in FIG. 4. The machine readable instructions may be one or more executable programs or portion(s) of one or more executable programs for execution by programmable circuitry such as the programmable circuitry 512 shown in the example programmable circuitry platform 500 discussed below in connection with FIG. 5 and/or may be one or more function(s) or portion(s) of functions to be performed by the example programmable circuitry. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 4, many other methods of implementing the example transmission manager circuitry 120 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 4 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 4 is a flowchart representative of example machine readable instructions and/or example operations 400 that may be executed, instantiated, and/or performed by programmable circuitry to access unclassified data in the media storage 106. The example machine-readable instructions and/or the example operations 400 of FIG. 4 begin at block 402, at which the example data accessor circuitry 300 accesses, via a computing device (e.g., a first one of the second devices 110), first data (e.g., unclassified data) stored in memory (e.g., the media storage 106). The first one of the second devices 110 is conductively coupled to the media storage 106 via the second bus adapter 116 and the second expander 118. The second example bus adapter 116 prevents the first one of the second devices 110 from transmitting second data (e.g., classified data) to the media storage 106.

At block 404, the example change detection circuitry 302 monitors the media storage 106 for changes to the unclassified data stored in the media storage 106.

At block 406, the example change detection circuitry 302 determines whether there has been a change in the unclassified data stored in the media storage 106. If the change detection circuitry 302 determines that there has been a change to the unclassified data, then control of the process proceeds to block 408. For example, if the change detection circuitry 302 detects an addition of data (e.g., third data, additional unclassified data, etc.) to the media storage 106, then the change detection circuitry 302 determines that there has been a change in the unclassified data. In such examples, control of the process proceeds to block 408. Alternatively, if the change detection circuitry 302 determines that there has not been a change to the unclassified data, then control of the process proceeds to block 408. For example, if the change detection circuitry 302 does not detect any modifications, additions, deletions, replacements, etc., to the unclassified data stored in the media storage 106, then the change detection circuitry 302 determines that there has been no change to the unclassified data in the media storage 106. In such examples, control of the process returns to block 404. The example change detection circuitry 302 continues to monitor the unclassified data stored in the media storage 106 until there has been a change.

At block 408, the example data accessor circuitry 300 can access the changed unclassified data (e.g., the modified unclassified data, the additional unclassified data, etc.) in the media storage 106 via the first one of the second devices 110. Then, the process ends.

Figure 5:
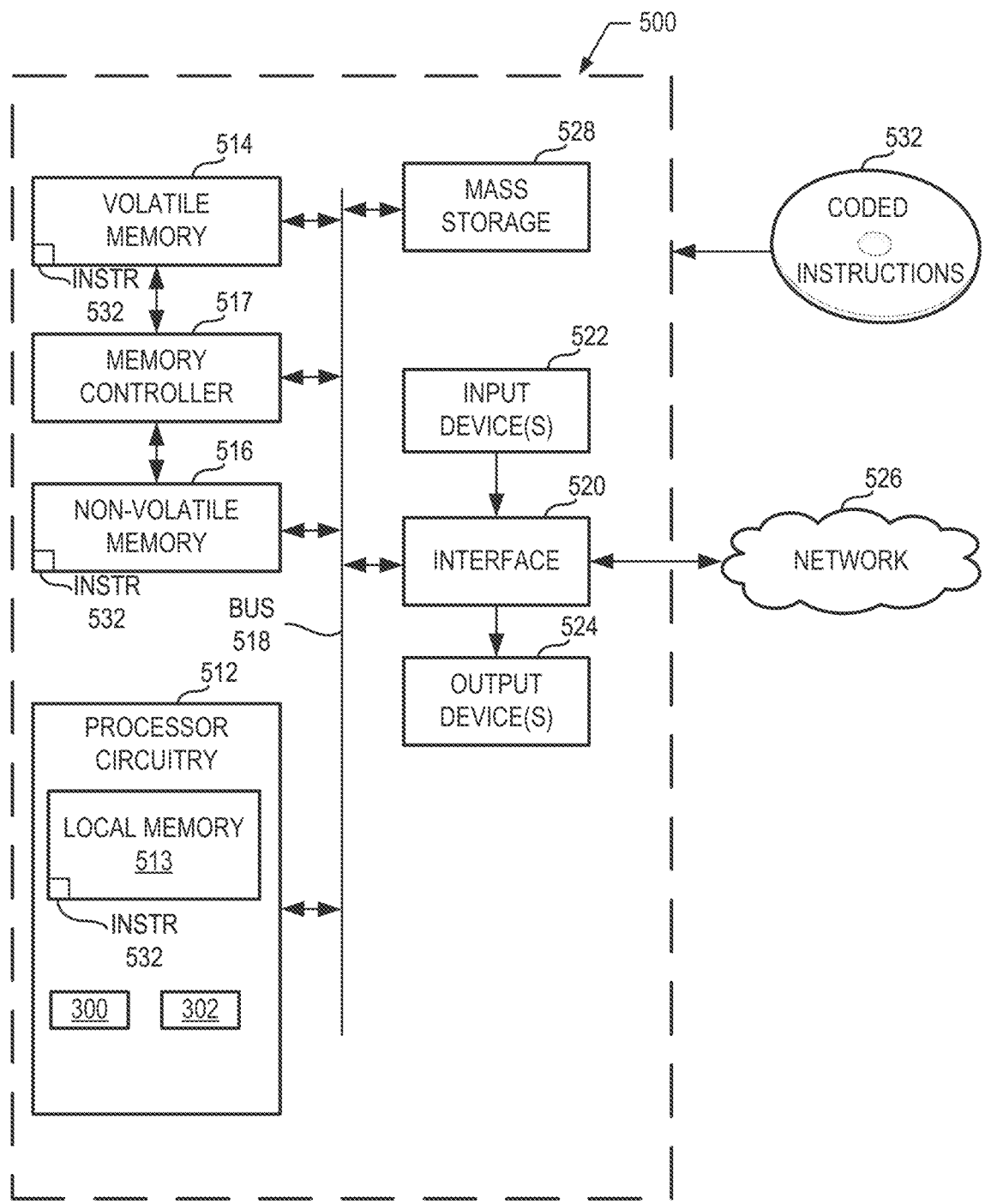
FIG. 5 is a block diagram of an example processing platform including programmable circuitry structured to execute, instantiate, and/or perform the example machine readable instructions and/or perform the example operations of FIG. 4 to implement the example transmission manager circuitry of FIG. 3.

FIG. 5 is a block diagram of an example programmable circuitry platform 500 structured to execute and/or instantiate the example machine-readable instructions and/or the example operations of FIG. 4 to implement the example transmission manager circuitry 120 of FIG. 3. The programmable circuitry platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 500 of the illustrated example includes programmable circuitry 512. The programmable circuitry 512 of the illustrated example is hardware. For example, the programmable circuitry 512 can be implemented by one or more integrated circuits, logic circuits, microprocessors, CPUs, GPUs, DSPs, and/or microcontrollers from any desired family or manufacturer. The programmable circuitry 512 may be implemented by one or more semiconductor based (e.g., silicon based) devices. In this example, the programmable circuitry 512 implements the example data accessor circuitry 300 and the example change detection circuitry 302.

The programmable circuitry 512 of the illustrated example includes a local memory 513 (e.g., a cache, registers, etc.). The programmable circuitry 512 of the illustrated example is in communication with main memory 514, 516, which includes a volatile memory 514 and a non-volatile memory 516, by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517. In some examples, the memory controller 517 may be implemented by one or more integrated circuits, logic circuits, microcontrollers from any desired family or manufacturer, or any other type of circuitry to manage the flow of data going to and from the main memory 514, 516.

The programmable circuitry platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user (e.g., a human user, a machine user, etc.) to enter data and/or commands into the programmable circuitry 512. The input device(s) 522 can be implemented by, for example, an audio sensor, a microphone, a camera (still or video), a keyboard, a button, a mouse, a touchscreen, a trackpad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 500 of the illustrated example also includes one or more mass storage discs or devices 528 to store firmware, software, and/or data. Examples of such mass storage discs or devices 528 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 532, which may be implemented by the machine readable instructions of FIG. 4, may be stored in the mass storage device 528, in the volatile memory 514, in the non-volatile memory 516, and/or on at least one non-transitory computer readable storage medium such as a CD or DVD which may be removable.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that provide a hardware configuration that maintains electrical connections between an unclassified domain, a classified domain, and a memory device, while also preventing output of classified data from the classified domain. As such, disclosed examples may prevent the unauthorized disclosure of classified data. Moreover, disclosed examples evade the manual intervention of plugging/unplugging devices by providing a static hardware configuration that connects multiple devices in the classified domain and multiple devices in the unclassified domain to the memory device. Thus, disclosed examples free up hours of manual labor that would otherwise be needed to facilitate the flow of unclassified data. Disclosed systems, apparatus, articles of manufacture, and methods improve the efficiency of using a computing device by providing a static hardware configuration that mitigates ESD seen in other dynamic configurations (e.g., plugging and unplugging devices). Disclosed systems, apparatus, articles of manufacture, and methods are accordingly directed to one or more improvement(s) in the operation of a machine such as a computer or other electronic and/or mechanical device.

Example 1 includes an apparatus comprising memory, a first domain having a first classification, the first domain conductively coupled to the memory, the first domain including a first bus adapter to conductively couple the first domain to the memory, the first bus adapter enabling transmission of first data from the first domain to the memory, the first data associated with the first domain, and a first expander to facilitate the transmission of the first data to the memory, the memory to store the first data, and a second domain conductively coupled to the memory, the second domain having a second classification different from the first classification, the second domain including a second bus adapter to conductively couple the second domain to the memory, the second bus adapter enabling access of the first data from the memory by the second domain, the second bus adapter preventing second data from exiting the second domain, the second data associated with the second domain, and a second expander to facilitate the access of the first data from the memory.

Example 2 includes the apparatus of example 1, wherein the first classification is a first security clearance and the second classification is a second security clearance, the second security clearance higher than the first security clearance.

Example 3 includes the apparatus of example 1, wherein the first expander is a first serial attached small computer system interface (SCSI) (SAS) expander and the second expander is a second SAS expander.

Example 4 includes the apparatus of example 1, wherein the memory is a SAS media storage device.

Example 5 includes the apparatus of example 1, further including a first computing device associated with the first domain, the first computing device including the first bus adapter, the first computing device conductively coupled to the first expander, and a second computing device associated with the second domain, the second computing device including the second bus adapter, the second computing device conductively coupled to the second expander, the second bus adapter preventing transmission of the second data from the second computing device to the first computing device.

Example 6 includes the apparatus of example 1, wherein the first bus adapter is a first host bus adapter (HBA) SAS card and the second bus adapter is a second HBA SAS card.

Example 7 includes the apparatus of example 6, wherein the first HBA SAS card is read/write enabled.

Example 8 includes the apparatus of example 6, wherein the second HBA SAS card is write-block enabled.

Example 9 includes the apparatus of example 1, wherein the memory includes a first media drive and a second media drive, the first and second expanders conductively coupled to the first and second media drives.

Example 10 includes the apparatus of example 9, wherein the first media drive includes a first input channel and a first output channel and the second media drive includes a second input channel and a second output channel, the first expander coupled to the first and second input channels and the second expander coupled to the first and second output channels.

Example 11 includes a system comprising memory storing first data, the first data associated with a first classification, a computing device including a bus adapter, the bus adapter to permit the computing device to access the first data, and prevent transmissions of second data from the computing device to the memory, the second data associated with a second classification different from the first classification, and an expander conductively coupled to the bus adapter and at least one channel in the memory, the expander to facilitate the access of the first data.

Example 12 includes the system of example 11, wherein the expander is conductively coupled to an output channel of a first media drive and an output channel of a second media drive, the second media drive different from the first media drive.

Example 13 includes the system of example 11, wherein the bus adapter is a host bus adapter (HBA) serial attached small computer system interface (SCSI) (SAS) card.

Example 14 includes the system of example 11, wherein the expander is a SAS expander.

Example 15 includes the system of example 11, wherein the memory is a SAS media storage device.

Example 16 includes the system of example 11, wherein the first classification is confidential and the second classification is not confidential.

Example 17 includes the system of example 11, wherein the computing device is one of a plurality of computing devices in a domain, wherein the first classification matches a classification of the domain.

Example 18 includes the system of example 11, wherein the computing device is a server.

Example 19 includes a method comprising accessing, via a computing device, first data stored in memory, the first data associated with a first classification, the computing device conductively coupled to the memory via a bus adapter and an expander, the bus adapter preventing the computing device from transmitting second data to the memory, the second data associated with a second classification different from the first classification, and after detecting a change associated with the first data stored in the memory, access the changed first data via the computing device.

Example 20 includes the method of example 19, wherein the change includes an addition of third data to the first data, the third data associated with the first classification.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   memory;
   a first domain having a first classification, the first domain conductively coupled to the memory, the first domain including:
      a first bus adapter to conductively couple the first domain to the memory, the first bus adapter enabling transmission of first data from the first domain to the memory, the first data associated with the first domain, and the first bus adapter being a first host bus adapter (HBA) serial attached small computer system interface (SCSI) (SAS) card; and
      a first expander to facilitate the transmission of the first data to the memory, the memory to store the first data; and
   a second domain conductively coupled to the memory, the second domain having a second classification different from the first classification, the second domain including:
      a second bus adapter to conductively couple the second domain to the memory, the second bus adapter enabling access of the first data from the memory by the second domain, the second bus adapter preventing second data from exiting the second domain, the second data associated with the second domain, the second bus adapter being a second HBA SAS card, and the second HBA SAS card being write-block enabled; and
      a second expander to facilitate the access of the first data from the memory.

2. The apparatus of claim 1, wherein the first classification is a first security clearance and the second classification is a second security clearance, the second security clearance higher than the first security clearance.

3. The apparatus of claim 1, wherein the first expander is a first serial attached small computer system interface (SCSI) (SAS) expander and the second expander is a second SAS expander.

4. The apparatus of claim 1, wherein the memory is a SAS media storage device.

5. The apparatus of claim 1, further including:
   a first computing device associated with the first domain, the first computing device including the first bus adapter, the first computing device conductively coupled to the first expander; and
   a second computing device associated with the second domain, the second computing device including the second bus adapter, the second computing device conductively coupled to the second expander, the second bus adapter preventing transmission of the second data from the second computing device to the first computing device.

6. The apparatus of claim 1, wherein the first HBA SAS card is read/write enabled.

7. The apparatus of claim 1, wherein the memory includes a first media drive and a second media drive, the first and second expanders conductively coupled to the first and second media drives.

8. The apparatus of claim 7, wherein the first media drive includes a first input channel and a first output channel and the second media drive includes a second input channel and a second output channel, the first expander coupled to the first and second input channels and the second expander coupled to the first and second output channels.

9. A system comprising:
   memory storing first data, the first data associated with a first classification;
   a computing device including a bus adapter, wherein the bus adapter is a host bus adapter (HBA) serial attached small computer system interface (SCSI) (SAS) card that is write-block enabled, the bus adapter to:
      permit the computing device to access the first data; and
      prevent transmissions of second data from the computing device to the memory, the second data associated with a second classification different from the first classification; and
   an expander conductively coupled to the bus adapter and at least one channel in the memory, the expander to facilitate the access of the first data.

10. The system of claim 9, wherein the expander is conductively coupled to an output channel of a first media drive and an output channel of a second media drive, the second media drive different from the first media drive.

11. The system of claim 9, wherein the expander is a SAS expander.

12. The system of claim 9, wherein the memory is a SAS media storage device.

13. The system of claim 9, wherein the first classification is confidential and the second classification is not confidential.

14. The system of claim 9, wherein the computing device is one of a plurality of computing devices in a domain, wherein the first classification matches a classification of the domain.

15. The system of claim 9, wherein the computing device is a server.

16. A method comprising:
   accessing, via a computing device, first data stored in memory, the first data associated with a first classification, the computing device conductively coupled to the memory via a bus adapter and an expander, the bus adapter being a host bus adapter (HBA) serial attached small computer system interface (SCSI) (SAS) card that is write-block enabled, and the bus adapter preventing the computing device from transmitting second data to the memory, the second data associated with a second classification different from the first classification; and
   after detecting a change associated with the first data stored in the memory, access the changed first data via the computing device.

17. The method of claim 16, wherein the change includes an addition of third data to the first data, the third data associated with the first classification.

* * * * *